Sept. 12, 1933.   E. HURLBRINK ET AL   1,926,149
APPARATUS FOR DELIVERING AND MEASURING LIQUIDS,
SUCH AS FUELS AND LUBRICATING OIL
Filed Oct. 30, 1931   5 Sheets-Sheet 1
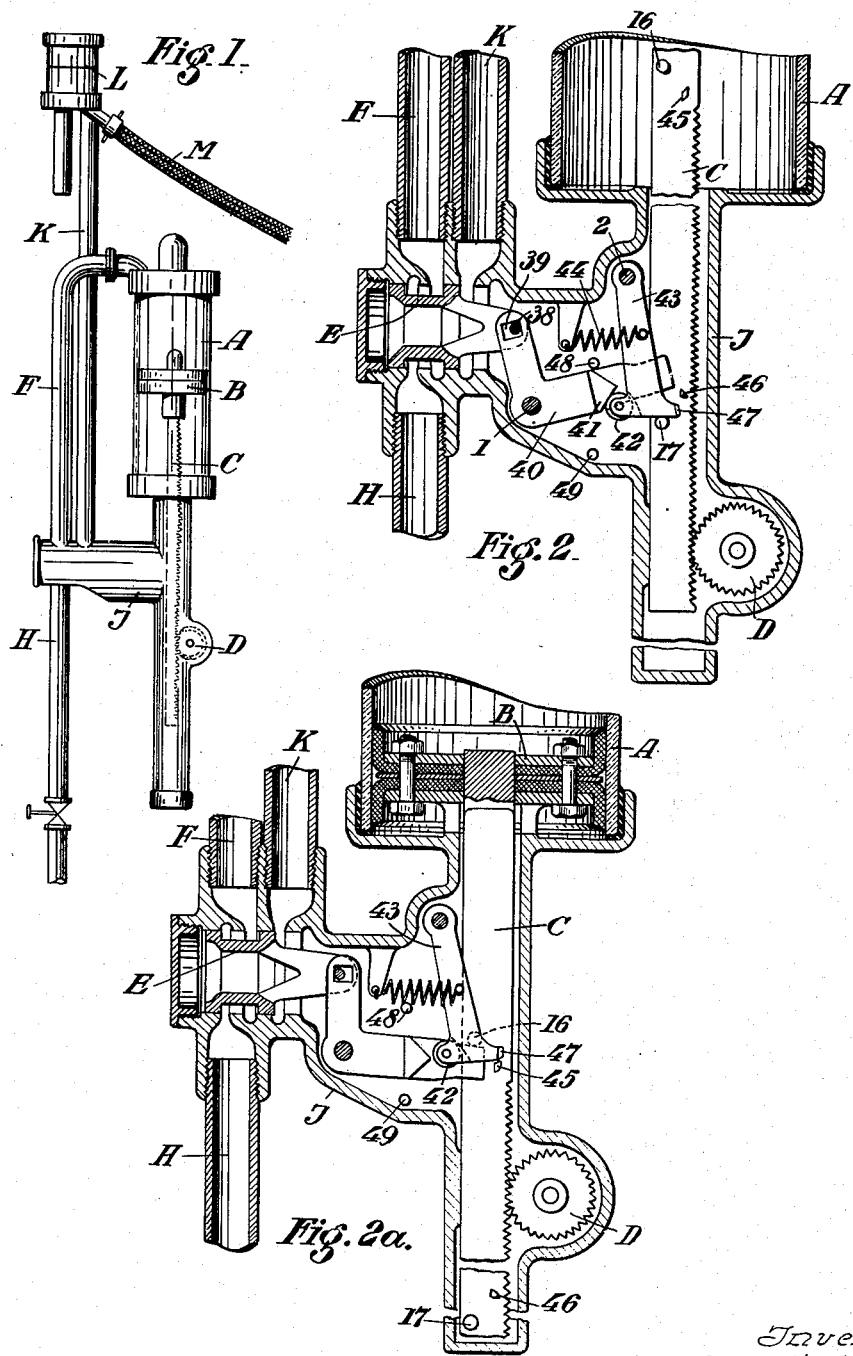

Sept. 12, 1933.　　　E. HURLBRINK ET AL　　　1,926,149
APPARATUS FOR DELIVERING AND MEASURING LIQUIDS,
SUCH AS FUELS AND LUBRICATING OIL
Filed Oct. 30, 1931　　　5 Sheets-Sheet 3

Inventors:
E. Hurlbrink
F. Kirchhoff
By Marks & Clerk
Attys.

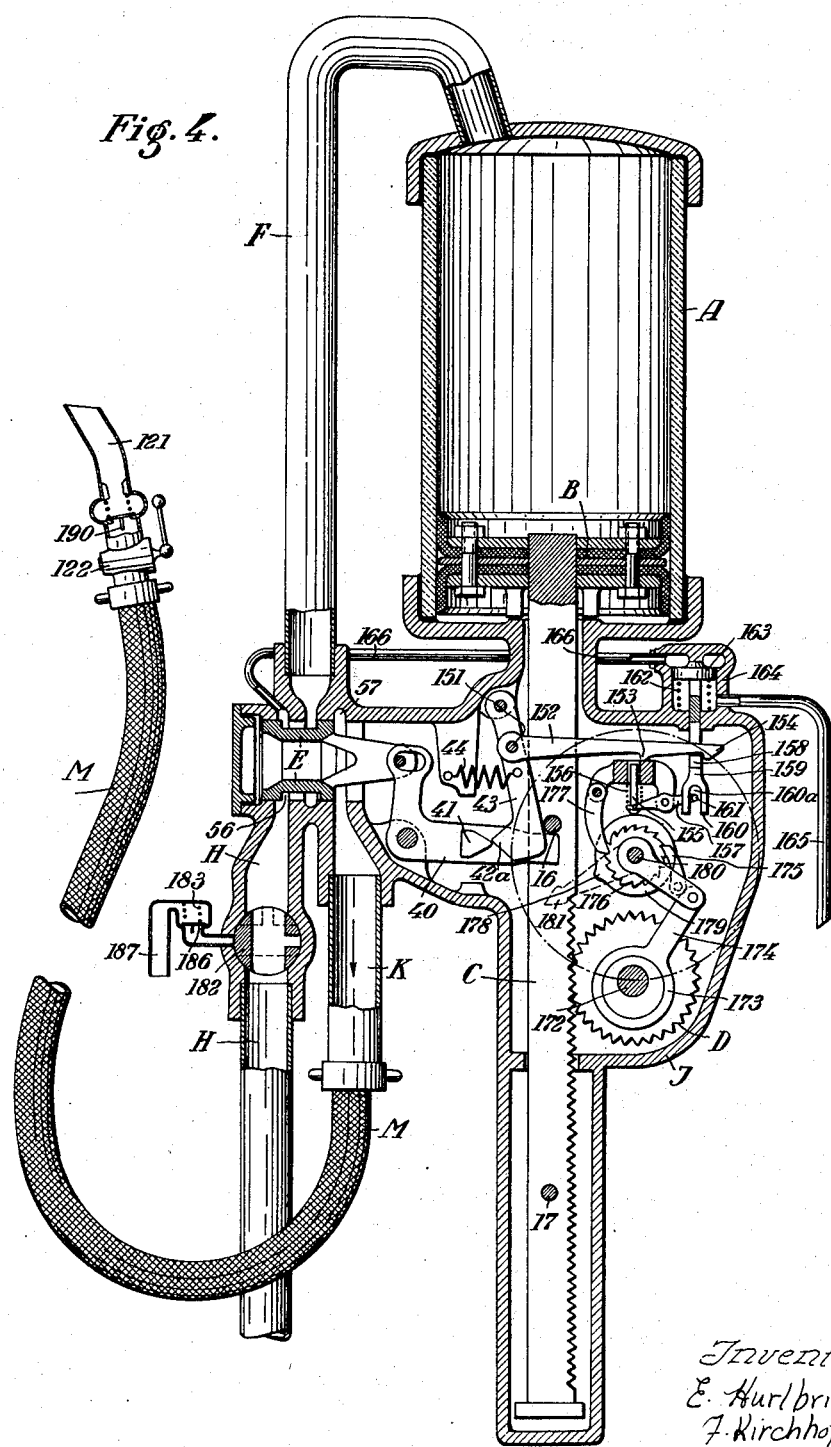

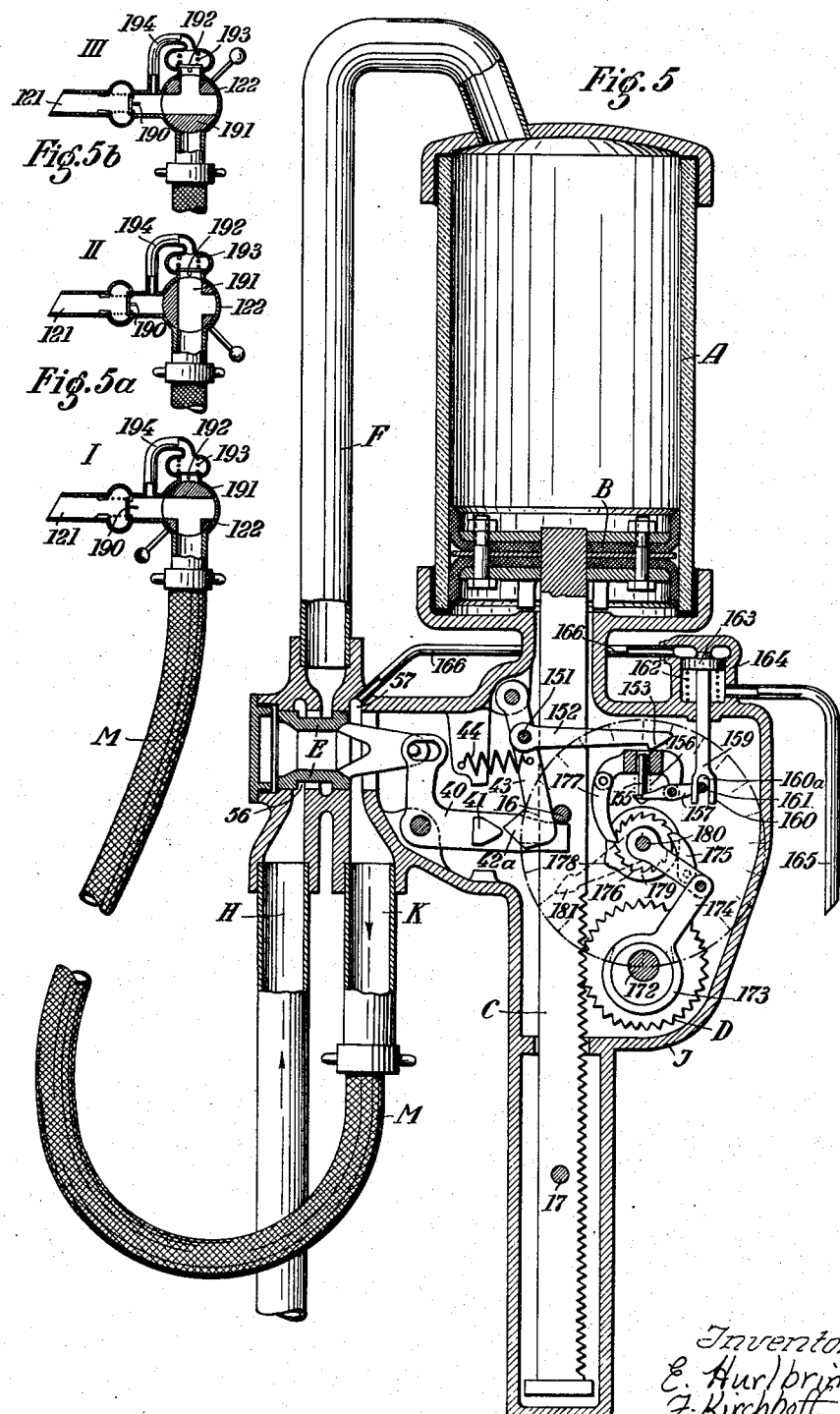

Patented Sept. 12, 1933

1,926,149

UNITED STATES PATENT OFFICE 1,926,149

APPARATUS FOR DELIVERING AND MEASURING LIQUIDS, SUCH AS FUELS AND LUBRICATING OIL

Ernst Hurlbrink, Berlin-Westend, and Friedrich Kirchhoff, Neubabelsberg, Germany, assignors to the firm Fabrik explosionssicherer Gefässe Salzkotten G. m. b. H., Salzkotten, Germany Application October 30, 1931, Serial No. 572,162, and in Germany November 6, 1930

44 Claims. (Cl. 221—100)

This invention relates to apparatus for delivering and measuring liquids, such as fuels and lubricating oil and more particularly to apparatus of the kind having a piston which moves to and fro in a cylinder forming the measuring spaces, and which determines the volume of the liquid drawn into and driven out of the measuring cylinder at each to and fro stroke of the piston which actuates a counting mechanism which for indicating the quantity of liquid delivered. Each end of the measuring cylinder is in communication through a pipe with a change-over member, to which is also connected the supply pipe and the delivery or tapping off pipe of the liquid, and which is so operated that it alternately connects one of the pipes with the supply pipe and the other with the tapping off pipe and vice versa. The liquid can be fed to the measuring cylinder by means of a pump operated by hand or motor, or in some other way, for instance by the introduction of gas or water under pressure, into the storage vessel.

The invention has for its object to improve the construction and operation of apparatus for the delivery and measurement of liquids of the kind described, by simple, cheap and yet reliable means. This is effected by causing the change-over of the liquid pipes for the measuring cylinder to take place only when the measuring piston has actually reached the end of its stroke, so that at each piston stroke the whole of the volume of liquid determined by the extreme position of the piston is delivered. Further objects and features of the invention will appear in the course of the following description and be specifically set forth in the claims.

In the accompanying drawings which illustrate the invention in several constructional forms by way of example, Fig. 1 shows a tapping and measuring apparatus of the kind to which the invention relates, in a diagrammatic side elevation.

Figs. 2 and 2a show in vertical section through the lower portion of the measuring cylinder, the change-over member and one constructional form of the associated operating mechanism in two different operative positions.

Figs. 4 and 5 illustrate further constructional forms of the invention.

Figs. 5a and 5b show a tapping mouthpiece belonging to the constructional form according to Fig. 5, in different operative positions

Figure 3:
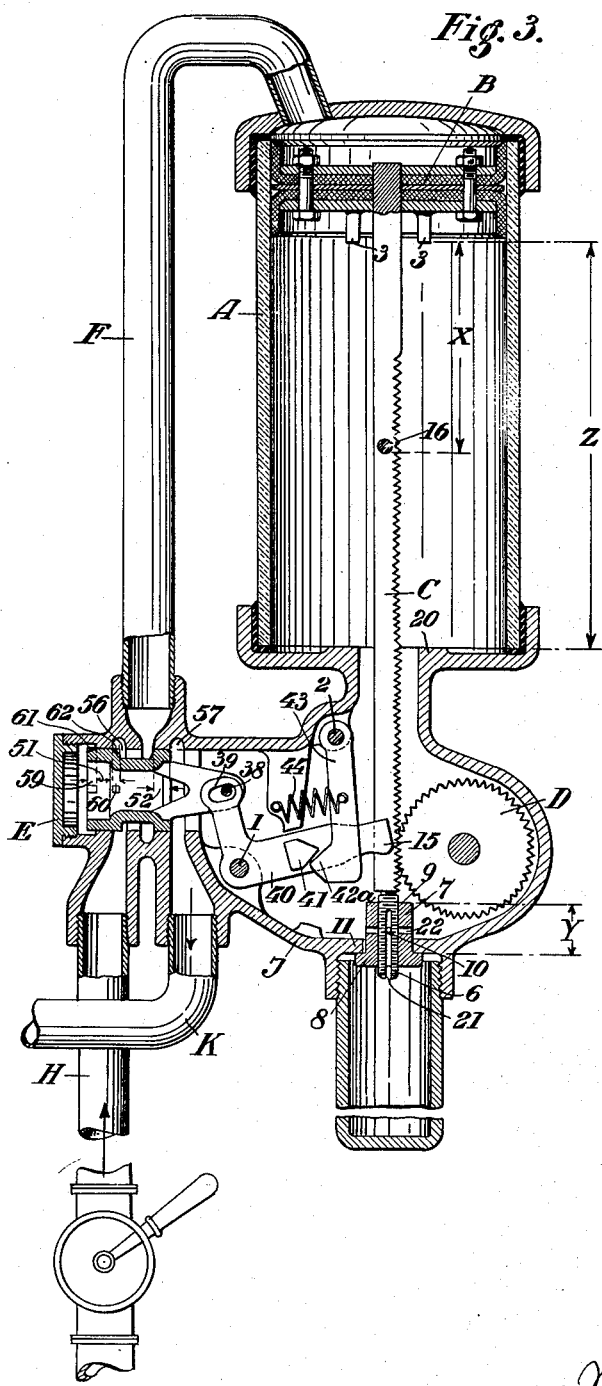
Fig. 3 shows a similar view to Fig. 2 of another constructional form.

Fig. 1 shows a constructional form in which the measuring piston B which moves in the measuring cylinder A actuates by means of the rack C connected to it and a pinion D meshing with the teeth of the said rack the drive for the counter not shown in the drawings. J is a casing which is connected to the lower part of the cylinder A so as to be in communication therewith and which encloses both the piston rod C and its driving pinion D as well as the change-over member E (Fig. 2) and the operating mechanism thereof. The change-over member communicates through the interior of the casing J with the lower end of the cylinder and through the pipe F with the upper end of the cylinder. There are also connected to the casing of the change-over member the supply pipe H coming from the storage vessel for the liquid to be delivered and the pipe K which is connected to an observation vessel L to which the tapping hose M is connected.

The liquid, which is conveyed by a pump built into the supply pipe H, moves the piston B upwards and downwards in the cylinder A. At the end of each stroke of the piston the change-over member E is automatically operated in such a manner that, assuming the upper end of the cylinder to be connected through the connecting pipe F with the supply pipe H and the lower cylinder end through the space in the casing J with the tapping pipe K, after the change-over the tapping pipe K will be connected with the upper end of the cylinder and the supply pipe H with the lower end. Thus at each stroke of the piston liquid is introduced on one side of the piston by way of the pipe H and liquid is expelled on the other side of the piston by way of the pipe K. The quantity of liquid delivered is registered by means of a counting device of a known kind, not shown in Fig. 1, which is driven by the pinion D and which counts the to and fro motions of the measuring piston and consequently the quantity of liquid driven out by the piston.

Fig. 2 illustrates the position of the parts at the commencement of the downward motion of the piston and Fig. 2a the position at the moment in which the piston has come to the end of its stroke. The change-over member E, which is constructed in the form of a tubular slide valve with a bore extending through it, is connected by a bell crank 40 pivoted at 1 and having a hole 39 in one arm in which engages a pin 38 on the change-over member, said hole being considerably greater than the diameter of the pin, so that the valve E is reciprocated by the lever 40 during each to and fro motion of the lever, not immediately but only after the latter has performed an idle motion. On the other arm of the bell crank is a two-sided roof-shaped cam 41 which coacts with the roller 42 of a lever 43 which is pivoted at 2 and is acted on by a tension spring 44. The bell crank 40 is moved upwards and downwards at the end of each piston stroke by driving pins 16 and 17 and has its stroke limited by stops 48 and 49. On the piston rod C there are further provided lugs 45 and 46 which coact with a lug 47 on the lever 43, in such a manner that the lever 43 when raised against the force of the tensioning spring 44, is held by the lug 45 or 46 until the piston has come to the end of its stroke, whereupon the lug 45 or 46 releases the lug 47 and thus allows the spring 44 to act, which thereupon reverses the slide by means of the lever 40.

The arrangement operates in the following manner: On the piston being moved downwards out of the position of the parts shown in Fig. 2, the pin 16 shortly before the end of the stroke strikes against the bell crank 40 and moves it downwards, the roller 42 being forced aside by the cam 41 in opposition to the force of the spring 44. On this taking place the slide E will in the first instance not be affected, as the wall of the elongated hole 39 does not at first make contact with the driving pin 38. As soon as the apex of the cam 41 has passed beyond the straight line connecting the centre of rotation of the roller with the pivotal point of the lever 40 (extreme position), the stop 45 on the piston rod C engages under the lug 47 on the lever 43, thereby preventing the roller 42 rolling down on the lower flank of the cam 41, until the piston has completed its stroke, that is, until the piston B has reached the limit of its stroke. At the same moment as shown in Fig. 2a, the lug 45 on the piston rod also releases the lug 47 on the lever 43, which under the influence of the spring 44 thereupon presses the roller 42 against the lower flank of the cam 41, forces the latter aside and thereby moves the lever 40 until it strikes against the stop 49. The pin 38 is at the same time carried along by the elongated hole 39, that is to say, the slide E is changed over into the position in which the liquid coming from the pipe H and flowing to the lower side of the piston flows through it. The lug 45 is arranged exactly in a position with respect to the edge which releases the lug 47 of the spring actuated lever 43 such that the release takes place at the same moment in which the piston reaches its extreme bottom position.

Owing to the change over of the liquid paths the piston is thereupon moved upwards again, the stop pin 17 shortly before the end of the stroke striking against the bell crank 40 and raising the latter by lifting the roller 42 and tensioning the spring 44, without however moving the slide E. Thereupon in the extreme position of the apex of the cam, the stop 46 engages under the stop 47 of the lever 43 again preventing the spring 44 from changing over the controlling valve E until the piston has arrived at the top end of its stroke. At the same moment the lug 46 releases the lug 47 of the lever 43, which, under the influence of the spring 44, acts with its roller 42 on the other flank of the cam 41 and causes the bell crank 40 to continue to move in the same direction, thereby changing over the control valve E. This cycle of operations is repeated at the end of each stroke.

Figure 3A:
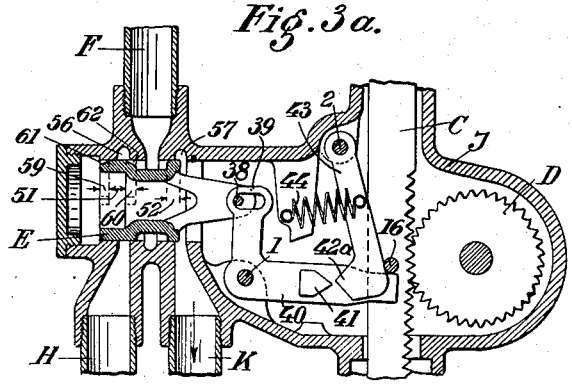
Fig. 3a represents the change-over member of this constructional form in another operative position.

The roller 42 of the lever 43 may with advantage be replaced as shown in Figs. 3 and 3a by a cam 42a which is also roof-shaped, and the lugs 45, 46 and 47 may be entirely omitted if means be provided, whereby the moment in which the edges of the two cams pass one another corresponds as accurately as possible to the moment in which the piston, by striking against a fixed stop, reaches either end of its stroke. This constructional form operates otherwise substantially in the same way as was described above with reference to Figs. 2 and 2a. By substituting a counter cam having two flanks for the roller 42, the change-over operation may be caused to take place more suddenly and be brought more accurately into coincidence with each end of the stroke of the measuring piston.

In measuring appliances of the kind described, as the diameter of the piston is never absolutely exact, it is necessary to adjust the piston stroke by a trial method after the piston has been built into the measuring cylinder in such a manner that at each stroke exactly the desired volume of liquid, for instance one or two litres is delivered. In order that with such a setting the drivers provided on the piston rod, which cause the operation of the change-over member, shall be displaced at the same time, an arrangement such as that shown in Fig. 3 is adopted. In the constructional form there shown the stroke of the piston is limited in the bottom extreme position by stops 3, which strike against the cylinder end 20. The limiting stop for the upward stroke is formed by the collar 8 of a threaded sleeve 7 screwed on to the lower end of the piston rod C, which in the upper end position strikes against a flange 11 of the casing J. The upper end 9 of this sleeve forms the lower driver of the piston rod, which in the constructional forms shown in Figs. 2 and 2a is represented by the pin 17. The upper driver 16 is also a pin projecting from the piston rod as in the other constructional form. The threaded part 6 of the piston rod C which is screwed into the sleeve 7 is provided with a slot 21 and the sleeve 7 is provided with crossed bores 22. By means of a pin 10 inserted through the slot and one of the bores the sleeve may be fixed after being turned in different positions. The rest of the arrangement can be the same as in the cases described above.

In setting the arrangement first of all the amount X by which the middle driver 16 is spaced from the upper stroke-limiting stop B and the amount Y between the lower stroke-limiting stop 8 and the lower driver 9, is so adjusted that the change over of the slide takes place in each case at the moment in which the piston reaches the end of its stroke, that is to say, strikes with one of the stroke-limiting stops 3 or 8. The exact piston stroke is thereupon adjusted by turning the sleeve 7 upon the threaded part 6 of the piston rod, the arrangement being such that the sleeve can be fixed after each quarter of a revolution by means of the pin 10.

In the measuring appliance described with reference to Figs. 2 and 2a, the change-over of the slide E takes place at the moment in which the flow of liquid still has its full velocity owing to the motion of the measuring piston not yet being interrupted. The operation of the slide valve then takes place suddenly, whereby the movement of the liquid is instantly interrupted, resulting in shocks which shake the appliance and cause an unpleasant noise. This disadvantage is done away with by the special construction of the valve shown in Figs. 3 and 3a. The valve in this case has two main controlling surfaces 51 and 52, of which the former controls the liquid supply from the pipe H and the latter the liquid delivery through the pipe K. Both controlling surfaces 51 and 52 are made so wide that in an intermediate position they cover in each case the annular recesses 56 and 57 of the valve casing to which the liquid supply and delivery pipes H and K are connected and only establish a new connection after passing the covering position. At one of the two controlling surfaces 51 and 52, for instance the surface 51, widening surfaces 59 and 60 are provided, which have the same diameter as the main controlling surface 51, but each contain a groove-like recess 61 and 62, which after the initiation of the motion of the slide E until the slide reaches the position shown in Fig. 3a, form the only passage for the remaining liquid, so that the forward motion of the measuring piston B is progressively retarded. Instead of the widenings 59 and 60 being provided with grooves 61 and 62 they may be made slightly conical. The elongated hole 39 of the bell crank 40 is made such that the latter, when rocked by one of the driving members 16 or 9, brings the slide into the position corresponding to Fig. 3a before the apexes of the two cams 41 and 42a pass one another. As soon as this has taken place, the valve E is changed over rapidly, a liquid shock not occurring however. As soon as the change over is completed the cross-sectional areas of the passage again correspond to Fig. 3 with the difference that the passages are changed over alternately, that is to say, the flow of liquid takes place without any throttling, so that a normal tapping velocity may be employed.

There is the further disadvantage that the measuring piston does not complete the stroke right up to its stop, for instance if through the cam which operates the change over slide becoming worn the release of the spring effecting the change over takes place before the piston comes up against the stop at the end of its stroke. It is also difficult to cause the piston to come to rest exactly at the end of its stroke on a tapping being finished, as immediately after the initiation of a change over the oppositely directed piston motion commences again.

Both disadvantages are overcome in the constructional form of the invention illustrated in Figs. 5, 5a and 5b through the reversal of the change-over valve being retarded until the piston has reached its stop and a certain increase in pressure in the liquid has been produced under the influence of which an arresting device is made inoperative, which up to that point prevented the change over motion of the slide. A further advantage of this arrangement is that when using a hand pump the interruption of the tapping can be effected in a convenient manner exactly at the end of the piston stroke as on the piston approaching its stop an increase in the resistance on the pump lever can be felt and before the change over takes place and the piston reverses. A further advantage of the invention consists in this, that on an increase in pressure occurring during a measuring operation, for instance by the throttling of the hose cock, this increase in pressure operates an arresting device which definitely prevents the change over, in other words, terminates the tapping.

The lever 43, which effects the change over of the controlling valve E, is under the influence of a spring 44 and is provided with a cam 42a having two flanks, is connected by a pin 151 with a detent 152, the tooth 153 on which coacts with a stop pin 155 which is under the influence of a spring 156 and a lever 157, while a second tooth 154 on the detent 152 is under the influence of a stop 158 on a bar 159. This bar has a fork 160 at its lower end, which engages over a pin 161 on the lever 157, and is connected at the other end with a piston 163 acted on by a spring 162. This piston slides in a cylinder 164, the part of which containing the spring 162 is connected by a pipe 165 to the atmosphere and is therefore always free from pressure, while the part lying above the piston is connected by a connecting pipe 166 and an annular groove 56 in the casing of the slide E to the supply pipe H for the liquid under pressure. When as in the example shown a spring loaded valve 190 is provided in the mouthpiece 121 of the tapping hose M, the spring 162 of the controlling piston 163 is made of such a strength that a greater liquid pressure is required for causing the downward motion of the piston than is required for opening and keeping open the hose valve 190.

The piston B is in this case again rigidly connected to a piston rod C in the form of a rack which is provided with driving pins 16 and 17 for the bell crank 40 and in the teeth of which a pinion D engages. This pinion serves the purpose of operating a counting mechanism alongside the reciprocating piston rod. For this purpose the pinion D is journalled inside the casing J on a shaft 172, which carries an eccentric 173 which acts through its rod 174 on a pawl and ratchet mechanism 175 and by this means advances the ratchet wheel 176 which is prevented from turning backwards by a detent 177. The ratchet wheel is also coupled to a disc 179 disposed in the casing J and provided with a cam 178 and also to the shaft 180 which extends through the casing and bears on the outside of the latter a pointer 181 which indicates the reversals step by step, the pointer 181 can be adjusted from the outside each time at the commencement of a tapping to the desired quantity, the cam 178 on the disc 179 which is coupled with it being turned to the same extent. During the tapping operation the pointer 181 moves back from one scale graduation to another until the desired quantity has been delivered, the cam 178 at the finish interrupting the tapping by raising the stop pin 155.

The slide E, according to its position, connects either the liquid supply pipe H with the pipe F leading to the upper side of the piston and the space within the casing J which is permanently in communication with the under side of the piston to the tapping pipe K or conversely the liquid supply pipe H with the lower side of the piston and the pipe F from the upper side of the piston with the tapping pipe K. To the latter is connected the tapping hose M, the mouthpiece 121 of which has a cock 122 for throttling or closing it.

The liquid supply pipe H may be provided with a closing member 182 which, in the closing position shown in broken lines, connects the annular groove 56 of the slide E by way of a non-return valve 186 loaded by a weak spring 183 with an outflow pipe 187 for the liquid.

The pipe 166 for controlling the piston 163 may also be connected as indicated in Fig. 5 with the annular groove 57 of the slide E, which communicates with the tapping pipe K, and the hose cock 122 of the hose M may be a three-way cock, and a spring-loaded non-return valve 190 may be provided in the outflow nozzle, which prevents the entry of air so that the hose always remains full. The plug 191 of the tapping cock 122, when in the position I (Fig. 5), connects the hose M with the outflow valve 190, while when in the position II (Fig. 5a) it connects the hose M with a valve 192, the closing spring 193 of which is of such a strength that the pressure required for opening the valve is greater than that required for operating the controlling piston 163. The outflow 194 of the valve 192 also opens into the outflow valve 190. When the plug 191 is in the position III (Fig. 5b) the hose is completely shut off.

The arrangement shown in Fig. 4 operates in the following manner: On liquid being introduced under pressure through the supply pipe H, the piston B will be pushed upwards or downwards according to the position of the controlling valve E, a quantity of liquid corresponding to the stroke volume being forced through the tapping hose M. As in the constructional forms already described, towards the end of each piston stroke the bell crank 40 is turned a certain distance by one of the driving pins 16 or 17, which by means of its cam 41 forces the cam 42a of the lever 43 aside against the action of the spring 44 to such an extent that approximately at the same moment in which the piston B reaches the end of its stroke the cam 42a can slip off the opposite side of the cam 41 on the bell crank 40, causing the bell crank 40 to turn further and to change over the valve E. The backward motion of the lever 43 required for this purpose is, however, dependent on the release of the detent 152 connected to it, as the tooth 154 on this detent is held by the stop 158 which must move downwards if it is to release the tooth. This downward motion only takes place when, through the stoppage of the liquid caused by the measuring piston coming up against its stop, an increase of pressure occurs which exceeds by a certain amount the pressure caused by the closed hose valve 190, said increased pressure by acting on the piston 163 causing the latter to move downwards, whereby the stop 158 is also lowered, which then releases the tooth 154. Only then, by means of the controlling lever 43 can the spring 44 completely turn the bell crank 40 and thereby change over the valve E. By this means the change over is prevented from taking place, when the controlling cams 41 and 42a are worn, before the measuring piston B has reached its stop. This arrangement also provides the advantage that, when the liquid is conveyed by means of a hand pump, the operator can chose in a very convenient manner, each time the measuring piston has reached the end of its stroke, whether he will continue the tapping operation or interrupt it, while the piston is held exactly at the end of its stroke. All that he need do when he wishes to stop is to prevent any appreciable increase in pressure taking place and he will thus hold the piston exactly at the end of its stroke, while if he wishes to continue to pump he need only exert a slight pressure for bringing about the change over and continue operation.

When the liquid is conveyed by a motor-driven pump or by means of gas or water under pressure, the extra pressure acting on the piston 163 for bringing about the change over is of course produced regularly. It is however desirable to be able to bring about the final interruption of the tapping operation exactly at the end of a stroke of the measuring piston by operating the hose cock 122, as it is of importance to be able to operate the apparatus with a single man only at the end of the hose. This requirement is also fulfilled by the new arrangement. If the hose cock 122 be throttled during a piston stroke an increase in pressure will take place in the supply pipe H, while the piston is in motion, which suffices when the cock 122 is sufficiently throttled for moving the piston 163 downwards in opposition to the force of its spring 162, this downward motion being such that the bottom 160a of the fork 160 connected to the piston 163 acts on the lever 157 and forces the pin 155 in opposition to the force of its spring 156 into the path of the tooth 153. Hence when at the end of the stroke of the piston B the controlling lever 43 is forced aside against the force of its spring 44, although the tooth 154 of the detent 152 is released, the tooth 153 will slide over the raised stop pin 155 and be held by the latter, as the increased pressure in the supply pipe due to a change over not taking place is maintained, and the piston 163 cannot for the time being move back again. Thus, through the action of the controlling piston 163 on the stop pin 155, a definite interruption of the tapping operation is brought about through the increase in pressure when the hose cock 122 is throttled. In order to bring about a release again after a pause in the tapping operation and to be able to commence a fresh tapping operation, it is only necessary to move the stop cock 182 in the supply pipe H into its closed position in which it connects the inlet passage 184 with the liquid outflow pipe 187 by way of the spring-loaded non-return valve 186 which opens under the action of a slight pressure. This enables the piston 163 to lift again under the influence of its spring 162, forcing liquid out of the cylinder 164 into the outflow pipe 187, and the withdrawal of the stop pin 155 by its spring 156 is made possible, whereupon the spring 44 by means of the lever 43 and the bell crank 40 changes over the valve E before the projection 158 can arrest the tooth 154 on the detent 152.

If, when delivering by means of a motor-driven pump, as in the constructional form shown in Fig. 5, the delivery pipe 166 leading to the controlling piston 163 is connected to the annular outlet groove 57 of the valve E, and the tapping hose is provided with a three-way cock having a by-pass throttled by a spring-loaded valve, a tapping operation can be interrupted by the hose cock 191 being turned during a stroke of the measuring piston B into the throttling position II in which the liquid can pass only through the spring-loaded valve 192, to open which a pressure is required which will suffice to move the controlling piston 163 downwards in opposition to its spring, whereby the stop pin 155 is raised into its effective position and the change over is prevented. Thereupon the hose cock can be closed by being turned into the position III or, by being turned back into the position I, a fresh tapping may be commenced as after this turning back of the cock the spring 162 can push the controlling piston 163 back again, thereby releasing the change over. By turning the hose cock into the throttling position II, the termination of the tapping operation is prepared for in such a manner that it will take place exactly when the measuring piston B reaches the end of its stroke.

At each upward and downward stroke the piston rod C transmits its motion by means of its teeth to the pinion D, the diameter of which is made such that each stroke of the piston rod corresponds approximately to a complete revolution of the pinion D. At the same time the eccentric 173 performs a complete to and fro motion, advancing the ratchet wheel 176 and the pointer 181 each time by a scale graduation. When the pointer 181 has been set to a definite quantity, the controlling cam 178 being carried round to a corresponding extent, causing the spring 156 to withdraw the stop pin 155 out of its operative position, and when the quantity of liquid set for has been withdrawn, the cam 178 will during the delivery of the quantity from the last stroke engage again under the stop pin 155 and raise the latter against the action of its spring 156 back into its operative position. As the eccentric 173 is fixed on the shaft 172 in such a manner that during the first part of each complete revolution the ratchet wheel 176 will be advanced and in the second part of the revolution the withdrawal of the pawl 175 will take place, on the last stroke of the piston taking place the stop pin 155 will be raised during the first part of the said stroke through the action of the cam 178 into its operative position and, on the lever 43 being raised during the last part of the stroke of the piston B the tooth 153 of the detent 152 will fall over the stop pin 155 and hold the lever 43 so that a change over cannot take place and the measuring operation is interrupted.

The adjustability of the pointer with the controlling cam 178 in conjunction with the function of the piston 163 which responds to an increase in pressure leaves it to the discretion of the operator whether he will deliver the entire quantity set for at the commencement of the tapping operation or in case the tank to be filled should not be capable of holding the entire quantity he will interrupt the tapping operation by throttling the hose cock 122 sooner but with a complete stroke volume.

A further advantage of the automatic interruption of the tapping operation by the controlling cam 178 connected with the pointer 181 is that as long as the pointer stands at zero, the change over is automatically prevented. It is thus not possible to make the mistake of starting to pump without first setting the pointer to the amount to be delivered. This further point is also to be considered.

While in the automatically acting measuring devices hitherto known, more particularly those operating with two measuring bottles, the pointer of the counting mechanism is advanced at the moment in which a change over takes place and therefore the work of advancing the counting mechanism has to be performed by the spring which effects the change over, in the new construction there is a two-fold improvement: on the one hand the work of advancing the counting mechanism is not performed by the spring for effecting the change over and on the other hand the advance of the counting mechanism is effected slowly while the measuring piston is performing a stroke.

These effects are of considerable importance owing to the fact that with the pointer of the counting mechanism there is always associated an adding mechanism, the resistances of which vary greatly in amount as considerably more power has to be expended in turning a plurality of counter wheels than when turning a single wheel only. For this reason it is important to have unlimited power available for driving the counting mechanism, that is to say, not to cause this work to be performed by the spring which effects the change over of the controlling member. In the new construction the drive of the counting mechanism is effected by the measuring piston and this is effected during a portion of the stroke during which it has not to stress the change over spring. This is effected through the advancing of the counting mechanism taking place always, that is to say, during both the upward stroke and downward stroke in the first part of the stroke, while the stressing of the change over spring takes place at the end of the second part of the stroke. Owing to the fact that the advancing of the pointer and of the adding mechanism connected with it takes place quite slowly during a great portion of the first half of the stroke of the measuring piston B, the resistance of the adding mechanism and of the pointer does not in any way affect the piston even when a number of numeral wheels of the adding mechanism are advanced, as a very large piston surface is available for this purpose, that is to say, a completely positive advance of the counting mechanism which in no way affects the measuring apparatus is realized.

Figure 6:
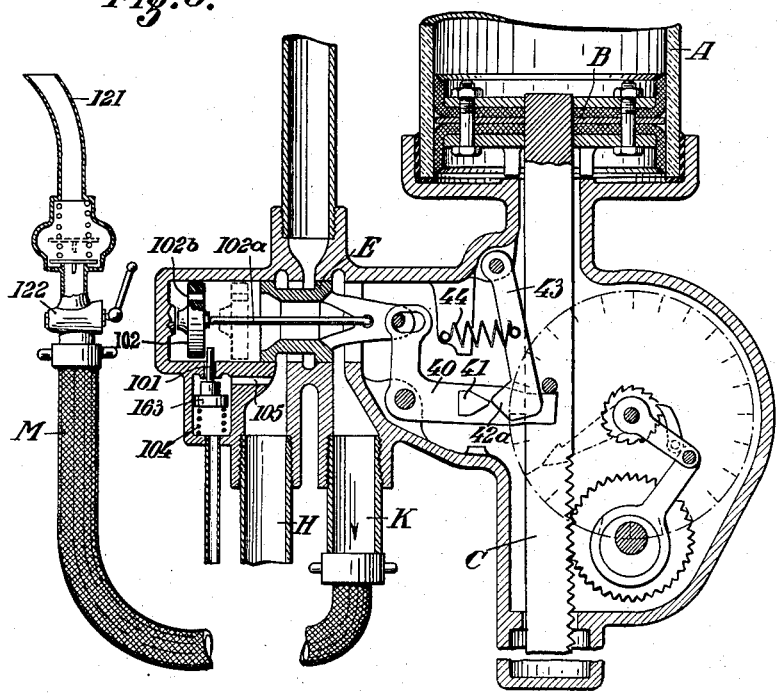
Fig. 6 shows a further constructional form.

The locking member actuated by the pressure member 163 which responds to the surge in the liquid pressure may, as shown in Fig. 6, engage directly with the change over slide E. The slide E is in this case for instance connected by a spindle 102a with a disc 102 which acts as a damping device. For this purpose it may be fitted with a certain amount of clearance in the part of the slide casing which guides it and/or be provided with a passage 102b extending through it. The disc 102 coacts with a locking pin 101 mounted on the piston 163. The latter is on the one side under the influence of a spring 104 and on the other side under the action of the pressure of the liquid entering from the supply pipe H by way of a bore 105. For the rest the arrangement is substantially the same as that described above.

The apparatus operates as follows: As soon as the measuring piston B has reached the end of a stroke and the lever 43 seeks under the influence of its spring 44 to effect the change over of the slide E, this change over is prevented by the locking pin 101 which arrests the disc 102, until the pressure in the supply pipe H has become sufficiently great to act on the piston 163 and through it withdraw the pin 101 out of its effective position in opposition to the force of the spring 104. Only when the operator who is conveying the liquid, for instance by working a hand pump, purposely causes the change over to take place, that is, purposely produces a rise in pressure, will the change over be effected. It is therefore easy, by avoiding this increase in pressure, to end the tapping operation by arresting the piston exactly at the end of a stroke.

A particularly simple and effective arrangement may be obtained when the damper disc 102 is used without the co-operation of locking means and is so constructed that the change-over motion of the valve E, which motion takes place under the influence of the actuating spring 44, is retarded for such a period that the pressure action, which also at the interruption of the tapping operation is not momentarily terminated in consequence of the inertia of the liquid column and/or of the influence of the expansion of the gas bubbles in the liquid, has time to disappear before the change-over motion is completed. Then at the stop of the supply pump the liquid is unable to act on the other side even for a short period against the measuring piston and press the same again from its end position somewhat to the rear, as might occur in the case of a non-retarded change-over motion.

This retardation of the change-over motion which of course may be accomplished by other means than by the damper disc shown in the drawings, especially in a measuring device with a manually operated pump for the supply of the liquid, has the further advantage that the operator will detect the end of the stroke of the measuring piston by feeling the strong resistance to the motion of the pump lever, so that the pump operation may be stopped in an exact temporal correspondence with the completion of the piston stroke. If the change-over slide is arranged to this end in such a way that during the change-over motion retarded by the damper disc the supply conduit is for a short time, for instance for a fraction of a second, fully obstructed, a considerable increase of the pressure is obtained in the supply conduit through which increase the operator is induced to stop the pumping operation. Also the tapping conduit may in the same way be obstructed by the slide during the retarded throw-over motion of the same.

The described construction of the change-over slide in connection with the retardation of its throw-over motion is also useful in a measuring device with a motor driven supply pump and also for a measuring device with liquid pressure-supply so far as the reversal of the motion of the measuring piston is retarded at the end of each stroke and watching for the moment to stop the pump motor or interrupt the pressure-supply is facilitated.

We claim:

1. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a lever to actuate said change-over member, a second lever adapted to operate said actuating lever and to be operated by it, the fulcrums of said levers being spaced apart from each other, resilient means adapted to cause said second lever to engage said actuating lever, a piston rod secured to said measuring piston, and means associated with said piston rod to operate said actuating lever at the end of each piston stroke.

2. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, an actuating lever, lost motion connecting means between said actuating lever and said change-over member, a spring actuated lever adapted to operate said actuating lever and to be operated by it, the fulcrums of said levers being spaced apart from each other, a roof-shaped cam secured to said actuating lever and adapted to engage said spring actuated lever, and means associated with said measuring piston to operate said actuating lever at the end of each piston stroke.

3. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, an actuating lever, lost motion connecting means between said actuating lever and said change-over member, a spring actuated lever adapted to operate said actuating lever and to be operated by it, the fulcrums of said levers being spaced apart from each other, a roof-shaped cam secured to said actuating lever and adapted to engage said spring actuated lever, means associated with said measuring piston to operate said actuating lever at the end of each piston stroke, a controlling lug on said spring actuated lever, and a pair of stops on the rod of said measuring piston, adapted first to lock said spring actuated lever after having passed its dead center position and to release said lever when the measuring piston has completed its stroke.

4. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a piston rod, one of said connecting conduits forming a casing communicating with one end of said measuring cylinder and enclosing said piston rod, a change-over member comprising a hollow slide valve, the bore of which communicating continuously with said casing and adapted to communicate in its end positions with said tapping-off conduit and said supply conduit respectively, and means to actuate said slide valve in the one and the other direction at each end of the stroke of the measuring piston.

5. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a bell crank lever, a pin and slot connection between said bell crank lever and said change-over member, a spring actuated lever adapted to operate said actuating lever and to be operated by it, the fulcrums of said levers being spaced apart from each other, a roof shaped cam secured to said bell crank lever, and adapted to engage said spring actuated lever, and means associated to said measuring piston to operate said bell crank lever at the end of each piston stroke.

6. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, an actuating lever, lost motion connecting means between said actuating lever and said change-over member, a spring actuated lever adapted to operate said actuating lever and to be operated by it, the fulcrums of said levers being spaced apart from each other, a roof-shaped cam secured to said actuating lever, a roof-shaped cam on said spring actuated lever adapted to cooperate with the roof-shaped cam of said actuating lever so as to operate it and to be operated by it, and means associated to said measuring piston to operate said actuating lever at the end of each piston stroke.

7. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, an actuating lever, lost motion connecting means between said actuating lever and said change-over member, a spring actuated lever adapted to operate said actuating lever and to be operated by it, the fulcrums of said levers being spaced apart from each other, a roof-shaped cam secured to said actuating lever, a roof-shaped cam on said spring actuated lever adapted to cooperate with the roof-shaped cam of said actuating lever so as to operate it and to be operated by it, a rod secured to said measuring piston, a pair of stops associated with said piston rod and having such a distance from each other, that the apexes of said cams will pass each other immediately before the measuring piston is stopped at the one or the other end of its stroke.

8. Apparatus for delivering and measuring liquids, such as fuel and lubricating oil, comprising: a measuring cylinder, a measuring piston movable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, two drivers associated with said measuring piston and adapted to control the movement of said change-over member, a fixed stop adapted to stop the movement of said measuring piston at one end of its stroke, and means to simultaneously adjust the position of said stop and one of said drivers relatively to said piston.

9. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinders, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a rod secured to said measuring piston, and a threaded sleeve adapted to be screwed on the free end of said piston rod and having two shoulders one of which being adapted to stop the movement of the measuring piston at one end of its stroke, the other one of said shoulders being adapted to control the movement of said change-over member.

10. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a rod secured to said measuring piston, a threaded sleeve adapted to be screwed on the free end of said piston rod and having two shoulders one of which being adapted to stop the movement of the measuring piston at one end of its stroke, the other one of said shoulders being adapted to control the movement of said change-over member, and means to lock said sleeve in a plurality of its adjusting positions.

11. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over valve adapted to alternately establish communication between one of said connecting conduits and said supply conduit and between the other one of said connecting conduits and said tapping off conduit and vice versa, and means to automatically actuate said valve at the ends of the stroke of said measuring piston, said valve having two main controlling surfaces adapted to cover in the intermediate position of the valve the passages communicating with the liquid supply and tapping off conduits respectively, and widening surfaces at at least one of said controlling surfaces adapted to throttle the liquid passage after the initiation of the motion of the valve.

12. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over valve adapted to alternately establish communication between one of said connecting conduits and said supply conduit and between the other one of said connecting conduits and said tapping off conduit and vice versa, and means to automatically actuate said valve at the end of each stroke of said measuring piston, said valve having two main controlling surfaces adapted to cover in the intermediate position of the valve the passages communicating with the liquid supply and tapping off conduits respectively, and widening surfaces at at least one of said controlling surfaces having grooves adapted to throttle the liquid passage after the initiation of the motion of the valve.

13. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over valve adapted to alternately establish communication between one of said connecting conduits and said supply conduit and between the other one of said connecting conduits and said tapping off conduit and vice versa, and means to automatically actuate said valve at the end of each stroke of said measuring piston, said actuating means comprising a lost motion connection, said valve having two main controlling surfaces adapted to cover in the intermediate position of the valve the passages communicating with the liquid supply and tapping off conduits respectively and widening surfaces at at least one of said controlling surfaces adapted to throttle the liquid passage after the initiation of the motion of the valve, said lost motion connection being thus measured that at each movement of the valve one of said widening surfaces will cause the liquid passage to be throttled before the valve will be by said actuating means positively thrown in its next end position.

14. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over slide valve adapted to alternately establish communication between one of said connecting conduits and said supply conduit and between the other one of said connecting conduits and said tapping off conduit and vice versa, and means to automatically actuate said slide valve at the end of each stroke of said measuring piston, said slide valve having two main controlling surfaces adapted to cover in the intermediate position of the slide valve the passages communicating with the liquid supply and tapping off conduits respectively and a pair of conical widening surfaces at at least one of said controlling surfaces, said widening surfaces adapted to throttle the liquid passage after the initiation of the throw-over motion of the slide valve.

15. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, resilient means adapted to be tensioned by said measuring piston and to control the movement of said change-over member, means to lock said resilient means in their tensioned position, and means to release said locking means in dependence on an increase of the fluid pressure in the supply conduit occurring at the end of the piston stroke.

16. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a lever to actuate said change-over member, a second lever adapted to operate said actuating lever and to be operated by it, resilient means adapted to cause said second lever to engage said actuating lever, a piston rod secured to said measuring piston, means associated with said piston rod to operate said actuating lever at the ends of each piston stroke, a detent connected to said second lever and having a tooth, a pressure member responsive to the fluid pressure in the supply conduit and having a rod, and a stop on said pressure member rod adapted to lock said tooth.

17. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, resilient means adapted to be tensioned by said measuring piston and to control the movement of said change-over member, means to lock said resilient means in their tensioned position, means to release said locking means in dependence on an increase of the fluid pressure in the supply conduit occurring at the end of the piston stroke, a valve arranged in said tapping off conduit near its free end, a spring adapted to control said valve, said releasing means comprising a releasing cylinder, a releasing piston moveable within said releasing cylinder, and a releasing piston spring engaging said piston, said releasing piston spring being tuned relatively to said valve controlling spring in such a way that a greater fluid pressure will be necessary for actuating said releasing pressure than for opening said tapping off conduit valve or for keeping said valve open.

18. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated with said measuring piston to actuate said change-over member near the end of each piston stroke, and locking means responding on an increase of the fluid pressure in said tapping conduit and adapted to lock said change-over member.

19. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated with said measuring piston to actuate said change-over member near the end of each piston stroke, locking means responding on an increase of the fluid pressure in said tapping off conduit and adapted to lock said change-over member, said locking means comprising a locking cylinder communicating with said tapping off conduit, a spring actuated piston within said locking cylinder, a detent connected to said change-over member actuating means and a pin adapted to be operated by said spring actuated piston and to engage said detent.

20. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated to said measuring piston to actuate said change-over member near the end of each piston stroke, locking means for said change-over member, responding on an increase of liquid pressure both in said supply conduit and in said tapping conduit, releasing means adapted on an increase of fluid pressure only in said supply conduit to make inoperative said locking means, both said locking and said releasing means comprising a common pressure member operatively connected to two locking members controlling the movement of said change-over member, one of said locking members operating in the reverse direction than the other one.

21. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa and to automatically return into its zero position during tapping, means to adjust said counting means into a position corresponding to the liquid volume to be delivered, locking means to automatically lock said change-over member, and means to operate said locking means under the control of said counting means.

22. Apparatus for delivering and measuring liquids, such as fuel and lubricating oil, comprising: a measuring cylinder, a measuring piston moveable to and fro within said cylinder, counting means adapted to be operated by said piston and to automatically return into its zero position during tapping, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means to adjust said counting means into a position corresponding to the liquid volume to be delivered, locking means to automatically lock said change-over member in the zero position of said counting means, and means to release said locking means in all other positions of said counting means.

23. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated with said measuring piston to actuate said change-over member near the end of each piston stroke, locking means adapted to lock said change-over member, and releasing means responding on an increase of liquid pressure occurring at the end of the stroke of said measuring piston in said supply conduit and adapted to release said locking means.

24. Apparatus for delivering and measuring liquids, such as fuel and lubricating oil, comprising: a measuring cylinder, a measuring piston moveable to and fro within said cylinder, counting means adapted to be operated by said piston and to automatically return into its zero position during tapping, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means to adjust said counting means into a position corresponding to the liquid volume to be delivered, a locking member adapted to lock said change-over member, said counting means comprising a cam adapted in the zero position of said counting means to engage said locking member so as to make it operative, and means to release said locking member in all other positions of said counting means.

25. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa and an advancing mechanism adapted to be positively operated by said measuring piston at each of its strokes and to operate said counting means, said advancing mechanism being designed in such a manner that it will perform an advancing movement at each piston stroke.

26. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, and a pawl and ratchet mechanism adapted to be operated through the intermediary of eccentric means by said measuring piston at each of its strokes and to step by step operate said counting means, said eccentric means and said pawl and ratchet means being designed in such a manner that at each stroke of the measuring piston during the first half of the rotation of the eccentric shaft the advancing of said counting means will take place, while the second half of the same rotation will cause the advancing pawl to return.

27. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated with said measuring piston to actuate said change-over member near the end of each piston-stroke, locking means adapted to lock said change-over member, releasing means responding on an increase of liquid pressure occurring at the end of the stroke of said measuring piston in said supply conduit and adapted to release said locking means, a closing member in said supply conduit, an outflow conduit, a non-return valve controlling said outflow conduit, and a weak spring tending to keep said non-return valve closed, said closing member in its closing position being adapted to establish communication between said outflow conduit and that part of the supply conduit which immediately communicates with said change-over member.

28. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated to said measuring piston to actuate said change-over member near the end of each piston stroke, locking means responding on an increase of the fluid pressure in said tapping conduit and adapted to lock said change-over member, a tapping valve in said tapping conduit comprising a three-way cock, having a plug, a mouth-piece at the free end of said tapping conduit, an outflow valve in said mouth-piece, a weak spring tending to keep said outflow valve closed, a by-pass communicating said cock with said mouth-piece, a by-pass valve in said by-pass, and a spring stronger than said first named spring tending to keep said by-pass valve closed, the plug of that three-way cock being adapted in one of its positions to allow the outflow of the liquid through said mouth piece and said outflow valve, in its second position to allow the outflow of the liquid through said by-pass and in the third position to completely close said tapping conduit.

29. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means associated with said measuring piston to actuate said change-over member near the end of each piston stroke, locking means responding on an increase of the fluid pressure in said tapping conduit and adapted to lock said change-over member, a tapping valve in said tapping conduit comprising a three-way cock, having a plug, a mouth-piece at the free end of said tapping conduit, an outflow valve in said mouth-piece, a weak spring tending to keep said outflow valve closed, a by-pass communicating said cock with said mouth-piece, a by-pass valve in said by-pass, and a spring stronger than said first named spring tending to keep said by-pass valve closed, the plug of that three-way cock being adapted in one of its positions to allow the outflow of the liquid through said mouth piece and said outflow valve, in its second position to allow the outflow of the liquid through said by-pass and in the third position to completely close said tapping conduit, said by-pass valve spring being measured in such a manner that the liquid pressure necessary to open said by-pass valve will be greater than the pressure necessary to operate said locking means.

30. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means adapted to normally lock said change-over member, and means to release said locking means, said releasing means being adapted to become operative on an increase of liquid pressure occurring at the end of each piston stroke.

31. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, means adapted to normally lock said change-over member, said locking means comprising a pressure member, a spring engaging said pressure member, a conduit communicating one side of said pressure member with said supply conduit, a locking member adapted to immediately lock said change-over member, and means to release said locking means, said releasing means being adapted to become operative on an increase of liquid pressure occurring at the end of each piston stroke.

32. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and said tapping off conduit and vice versa, a locking cylinder, a locking piston in said cylinder, a locking member connected to said locking piston, a locking spring tending to move said locking piston into its locking position, one side of said locking cylinder communicating with said supply conduit, and a stop positively connected to said change-over member, said locking member in its locking position adapted to engage said stop.

33. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and said tapping off conduit and vice versa, a locking cylinder, a locking piston in said cylinder, a locking member connected to said locking piston, a locking spring tending to move said locking piston into its locking position, one side of said locking cylinder communicating with said supply conduit, and damping means operatively connected to said change-over member and adapted to retard its throw-over movement, said locking member in its locking position adapted to engage said damping means.

34. Apparatus for delivering and measuring liquids, such as fuel and lubricating oil, comprising: a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and said tapping off conduit and vice versa, a locking cylinder, a locking piston in said cylinder, a locking member connected to said locking piston, a locking spring tending to move said locking piston into its locking position, one side of said locking cylinder communicating with said supply conduit, and a damper disk within the casing of said change-over member and connected to it, said locking member in its locking position adapted to engage said damper disk.

35. Apparatus for delivering liquids especially fuel and lubricating oil, comprising: a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, pressure means to supply liquid to said supply conduit, a tapping off conduit for said liquid, a change-over member adapted to alternately establish communication between one of said connecting conduits and said supply conduit and between the other one of said connecting conduits and said tapping off conduit and vice versa, means to retard the throw-over movement of said change-over member, and means to temporarily throttle said supply conduit so as to produce a strong liquid pressure in the supply conduit.

36. Apparatus for delivering and measuring liquids, such as fuel and lubricating oil, comprising: a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, pumping means to supply liquid to said supply conduit, a tapping off conduit for said liquid, a change-over slide adapted to alternately establish communication between one of said connecting conduits and said supply conduit and between the other one of said connecting conduits and said tapping off conduit and vice versa, and means to retard the thrown-over movement of said slide after having been initiated by means of said measuring piston, the controlling surface of said slide being measured relatively to the connecting opening of said supply conduit in such a manner, that the liquid passing said opening will be temporarily cut off during the throw-over movement of said slide.

37. Apparatus for delivering and measuring liquids, such as fuel and lubricating oil, comprising: a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, pumping means to supply liquid to said supply conduit, a tapping off conduit for said liquid, a change-over slide adapted to alternately establish communication between one of said connecting conduits and said supply conduit and between the other one of said connecting conduits and said tapping off conduit and vice versa, and means to retard the thrown-over movement of said slide after having been initiated by means of said measuring piston, the controlling surface of said slide being measured relatively to the connecting opening of said tapping off conduit in such a manner, that the liquid passing said opening will be temporarily cut off during the throw-over motion of said slide.

38. Apparatus for delivering and measuring liquids, such as fuel and lubricating oil, comprising a measuring cylinder, a measuring piston moveable to and fro within said cylinder, a measuring piston rod comprising a rack, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, and an advancing mechanism comprising a gear meshing with said piston rod rack and adapted to operate said counting means, said advancing mechanism being designed in such a manner that it will perform an advancing movement at each piston stroke.

39. Apparatus for delivering and measuring liquids, such as fuel and lubricating oil, comprising a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, a lever to actuate said change-over member, a second lever adapted to operate said actuating lever and to be operated by it, the fulcrums of said levers being spaced apart from each other, resilient means adapted to cause said second lever to engage said actuating lever, a piston rod secured to said measuring piston, means associated with said piston rod to operate said actuating lever at the end of each piston stroke, and means associated with said piston rod to positively operate said counting means independently from operating said actuating lever.

40. Apparatus for delivering and measuring liquids, such as fuel and lubricating oil, comprising a measuring cylinder, a measuring piston moveable to and fro within said cylinder, counting means adapted to be operated by said piston, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, spring means adapted to be strained by said measuring piston at each of its strokes and on being released to operate said change-over member, and means actuated by said measuring piston to operate said counting means independently from straining said spring means.

41. Apparatus for delivering liquids especially fuel and lubricating oil, comprising a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, and means associated with said change-over member to retard its throw-over movement, initiated at the end of each stroke of the measuring piston.

42. Apparatus for delivering liquids especially fuel and lubricating oil, comprising a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, pressure means to supply liquid to said supply conduit, and means associated with said change-over member to retard its throw-over movement initiated at the end of each stroke of the measuring piston.

43. Apparatus for delivering liquids especially fuel and lubricating oil, comprising a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said connecting conduits and said tapping off conduit and vice versa, and damper means associated with said change-over member and adapted to retard its movement initiated at the end of each stroke of the measuring piston.

44. Apparatus for delivering liquids especially fuel and lubricating oil, comprising a measuring cylinder, a measuring piston moveable to and fro within said cylinder, two connecting conduits, one of said conduits communicating with one end of said cylinder, the other one of said conduits communicating with the other end of said cylinder, a supply conduit for the liquid to be measured, a tapping off conduit for said liquid, a change-over member adapted to alternately establish communication between one of said connecting conduits and said supply conduit and between the other one of said conduits and said tapping off conduit and vice versa, and damper means associated with said change-over member and adapted to retard its movement initiated at the end of each stroke of the measuring piston, said change-over member comprising a slide valve having a controlling surface adapted during the throw-over movement of said slide valve to substantially close said supply conduit.

ERNST HURLBRINK.
FRIEDRICH KIRCHHOFF.